United States Patent
Sloane

(10) Patent No.: US 11,551,426 B2
(45) Date of Patent: Jan. 10, 2023

(54) SYSTEM FOR IMPLEMENTING STEGANOGRAPHY-BASED AUGMENTED REALITY PLATFORM

(71) Applicant: BANK OF AMERICA CORPORATION, Charlotte, NC (US)

(72) Inventor: Brandon Sloane, Indian Land, SC (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 0 days.

(21) Appl. No.: 17/344,037

(22) Filed: Jun. 10, 2021

(65) Prior Publication Data

US 2022/0398812 A1    Dec. 15, 2022

(51) Int. Cl.
*G06T 19/00* (2011.01)
*G06T 1/00* (2006.01)

(52) U.S. Cl.
CPC .......... *G06T 19/006* (2013.01); *G06T 1/0028* (2013.01); *G06T 2201/0065* (2013.01)

(58) Field of Classification Search
CPC ................ G06T 19/006; G06T 1/0028; G06T 2201/0065; G06F 11/2056; G06F 11/1469; G06F 11/1464; G06F 11/1435; G06F 11/3051; H04L 67/34; H04L 67/1095; H04L 67/104
See application file for complete search history.

(56) References Cited

U.S. PATENT DOCUMENTS

| | | | |
|---|---|---|---|
| 6,557,103 B1 | 4/2003 | Boncelet, Jr. et al. | |
| 8,933,889 B2 | 1/2015 | Heikkinen et al. | |
| 9,117,303 B2 | 8/2015 | Byrne et al. | |
| 9,501,856 B2 | 11/2016 | Mattila | |
| 9,558,559 B2 | 1/2017 | Fan et al. | |
| 9,632,315 B2 | 4/2017 | Smith et al. | |
| 9,699,375 B2 | 7/2017 | Fan et al. | |
| 9,939,650 B2 | 4/2018 | Smith et al. | |
| 9,990,772 B2 | 6/2018 | Ur et al. | |
| 9,995,936 B1 | 6/2018 | Macannuco et al. | |
| 10,078,867 B1 | 9/2018 | Chan et al. | |
| 10,084,828 B2 | 9/2018 | Sorin et al. | |
| 10,109,110 B2 | 10/2018 | Butler et al. | |
| 10,178,101 B2* | 1/2019 | Dintenfass | H04L 63/105 |
| 10,250,948 B1 | 4/2019 | Bortz et al. | |
| 10,326,933 B2 | 6/2019 | Liu et al. | |

(Continued)

*Primary Examiner* — Abderrahim Merouan
(74) *Attorney, Agent, or Firm* — Moore & Van Allen PLLC; Anup Shrinivasan Iyer

(57) ABSTRACT

Systems, computer program products, and methods are described herein for implementing steganography based augmented reality platform. The present invention is configured to provide an augmented reality application for installation on a computing device of a user; receive, via the augmented reality application, a real-time visual feed, wherein the real-time visual feed comprises an image, wherein the image comprises a message that is steganographically embedded therein; determine that the computing device of the user is authorized to access the message embedded in the image in the visual feed; and generate an acknowledgement that the computing device of the user is authorized to access the message embedded in the image in the visual feed; and transmit control signals configured to cause the computing device of the user to overlay, via the augmented reality application, the acknowledgement in a vicinity of the image in the real-time visual feed.

17 Claims, 3 Drawing Sheets

(56) References Cited

U.S. PATENT DOCUMENTS

| | | |
|---|---|---|
| 10,339,718 B1 | 7/2019 | Kamal et al. |
| 10,359,545 B2 | 7/2019 | Smith |
| 10,403,044 B2 | 9/2019 | Martin |
| 10,482,663 B2 | 11/2019 | Ghaly et al. |
| 10,499,997 B2 | 12/2019 | Weinstein et al. |
| 10,510,054 B1 | 12/2019 | Eidam |
| 10,602,117 B1 | 3/2020 | Cote et al. |
| 10,684,476 B2 | 6/2020 | Smith et al. |
| 10,754,156 B2 | 8/2020 | Harrison et al. |
| 10,831,334 B2 | 11/2020 | Martin |
| 11,115,615 B1 * | 9/2021 | Duda ............... G06Q 50/265 |
| 11,307,952 B1 * | 4/2022 | Sloane ............ G06F 11/2056 |
| 2007/0050360 A1 * | 3/2007 | Hull ............... G06V 30/18086 |
| 2009/0313245 A1 * | 12/2009 | Weyl ............... G06F 16/5846 707/999.005 |
| 2011/0282697 A1 * | 11/2011 | Fitzgerald ........ H04W 12/126 705/4 |
| 2012/0237908 A1 * | 9/2012 | Fitzgerald ......... H04W 4/029 434/236 |
| 2012/0329486 A1 * | 12/2012 | Gits ................ H04L 51/222 455/466 |
| 2013/0091564 A1 * | 4/2013 | Fitzgerald ......... G06F 21/88 726/17 |
| 2013/0249947 A1 | 9/2013 | Reitan |
| 2014/0200929 A1 * | 7/2014 | Fitzgerald ........ H04W 12/126 705/4 |
| 2016/0093000 A1 | 3/2016 | Pevzner et al. |
| 2016/0109954 A1 * | 4/2016 | Harris ............... G06F 3/011 345/156 |
| 2016/0259929 A1 * | 9/2016 | Cash ................ G07F 7/084 |
| 2016/0349511 A1 | 12/2016 | Meiron et al. |
| 2019/0317328 A1 * | 10/2019 | Bae ................ G02B 27/0093 |
| 2020/0026842 A1 * | 1/2020 | Jain ................ G06F 21/316 |
| 2020/0118121 A1 * | 4/2020 | Narang ............ G06Q 20/4014 |
| 2020/0382459 A1 | 12/2020 | Strubbe et al. |

* cited by examiner

SYSTEM FOR IMPLEMENTING STEGANOGRAPHY-BASED AUGMENTED REALITY PLATFORM

FIELD OF THE INVENTION

The present invention embraces a system for implementing steganography based augmented reality platform.

BACKGROUND

The use of augmented reality platforms in data center operations has increased in recent years. To maintain and structure operations, entities implement data center infrastructure management solutions using augmented reality platforms to streamline monitoring, management, and capacity planning of all resources in the data center. However, ensuring authorized access to monitoring such resources is a continuous challenge.

There is a need for a system for implementing steganography-based augment reality platform to ensure authorized access.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for implementing steganography based augmented reality platform is presented. The system comprising: at least one non-transitory storage device; and at least one processing device coupled to the at least one non-transitory storage device, wherein the at least one processing device is configured to: provide an augmented reality application for installation on a computing device of a user; receive, via the augmented reality application, a real-time visual feed, wherein the real-time visual feed comprises an image, wherein the image comprises a message that is steganographically embedded therein; determine that the computing device of the user is authorized to access the message; generate an acknowledgement that the computing device of the user is authorized to access the message; and transmit control signals configured to cause the computing device of the user to overlay, via the augmented reality application, the acknowledgement in the real-time visual feed in a vicinity of the image.

In some embodiments, the at least one processing device is further configured to: determine that the computing device of the user is authorized to access the message; automatically decrypt the image to extract the message based on at least determining that the computing device of the user is authorized to access the message; and transmit control signals configured to cause the computing device of the user to overlay, via the augmented reality application, the extracted message in the real-time visual feed in the vicinity of the image.

In some embodiments, the at least one processing device is further configured to: receive, via the augmented reality application, an indication that the user has selected the acknowledgement in the vicinity of the image; dynamically decrypt the image to extract the message based on at least receiving the indication; and transmit control signals configured to cause the computing device of the user to overlay, via the augmented reality application, the extracted message in the real-time visual feed in a vicinity of the image.

In some embodiments, determining that the computing device of the user is authorized to access the message further comprises: retrieving a unique device identifier associated with the computing device of the user; retrieving one or more device identifiers from a data repository associated with the image, wherein the one or more device identifiers are associated with one or more computing devices that are authorized to access the message; determining a match between the unique device identifier and the one or more identifiers; and determining that the computing device of the user is authorized to access the message based on at least determining the match.

In some embodiments, determining that the user is authorized to access the message, wherein determining further comprises: initiating, via the augmented reality application, an authentication request in response to receiving the real-time visual feed; receiving, via the augmented reality application, one or more authentication credentials of the user for processing; and determining that the user is authorized to access the message based on at least processing the one or more authentication credentials.

In some embodiments, the at least one processing device is further configured to: determine an authorization level of the user based on at least processing the one or more authentication credentials; determine an authorization requirement associated with accessing the message; determine that the authorization level of the user meets a portion of the authorization requirement associated with the accessing the message; automatically decrypt a portion of the message based on at least the portion of the authorization requirement that is met; and transmit control signals configured to cause the computing device of the user to overlay, via the augmented reality application, the portion of the message in the real-time visual feed in the vicinity of the image.

In some embodiments, the at least one processing device is further configured to: receive, via the augmented reality application, the real-time visual feed of a server in a data center, wherein the real-time visual feed comprises the image of an identifying label positioned on the server, wherein the message that is steganographically embedded in the image provides a real-time status of the server; determine that the computing device of the user is authorized to access the real-time status of the server; automatically decrypt the image to extract the real-time status of the server based on at least determining that the computing device of the user is authorized to access the real-time status of the server; and transmit control signals configured to cause the computing device of the user to overlay, via the augmented reality application, the real-time status of the server in the real-time visual feed in the vicinity of the identifying label.

In another aspect, a computer program product for implementing steganography based augmented reality platform is presented. The computer program product comprising a non-transitory computer-readable medium comprising code causing a first apparatus to: provide an augmented reality application for installation on a computing device of a user; receive, via the augmented reality application, a real-time visual feed, wherein the real-time visual feed comprises an image, wherein the image comprises a message that is steganographically embedded therein; determine that the computing device of the user is authorized to access the message; generate an acknowledgement that the computing device of the user is authorized to access the message; and transmit control signals configured to cause the computing device of the user to overlay, via the augmented reality application, the acknowledgement in the real-time visual feed in a vicinity of the image.

In yet another aspect, a method for implementing steganography based augmented reality platform is presented. The method comprising: providing an augmented reality application for installation on a computing device of a user; receiving, via the augmented reality application, a real-time visual feed, wherein the real-time visual feed comprises an image, wherein the image comprises a message that is steganographically embedded therein; determining that the computing device of the user is authorized to access the message; generating an acknowledgement that the computing device of the user is authorized to access the message; and transmitting control signals configured to cause the computing device of the user to overlay, via the augmented reality application, the acknowledgement in the real-time visual feed in a vicinity of the image.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
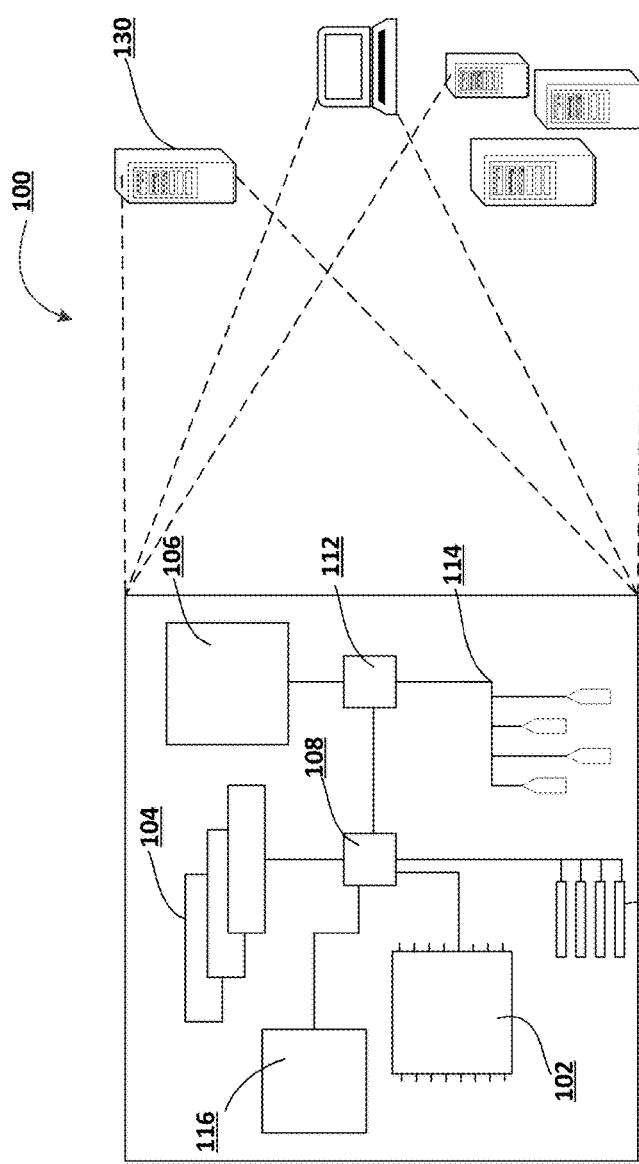
Figure 1:
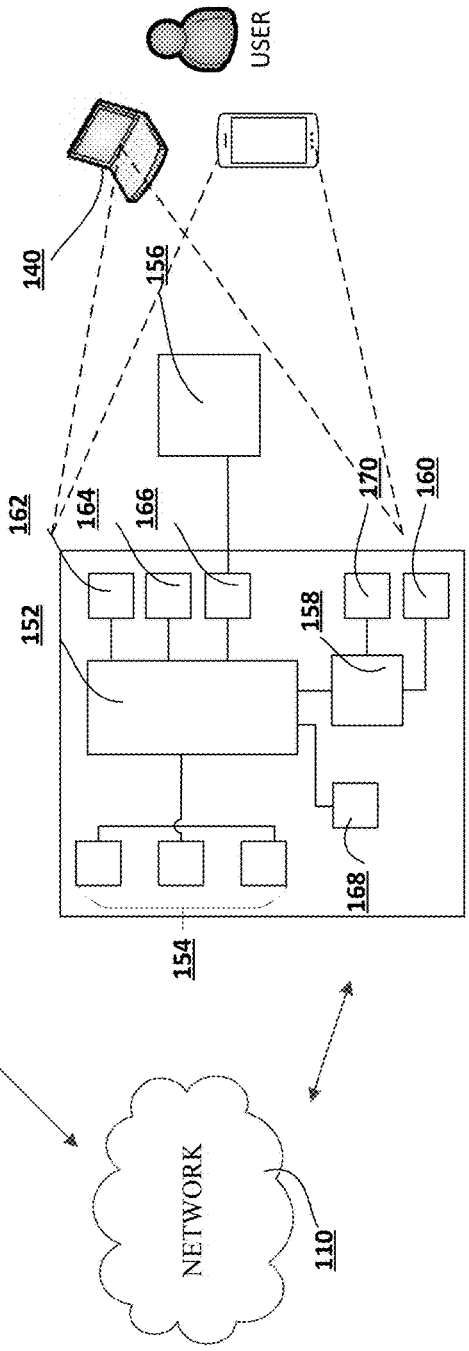
Figure 2:
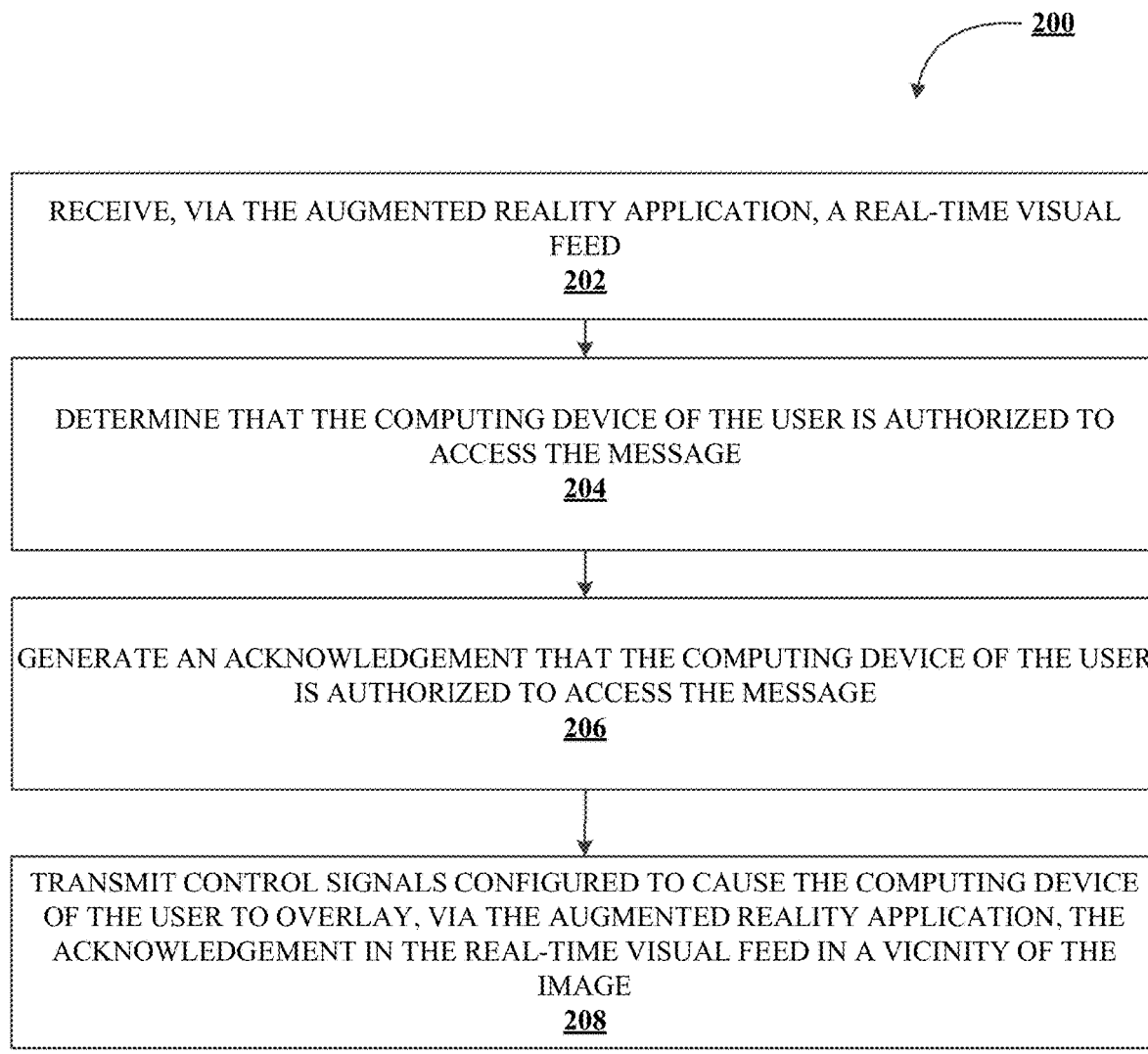
Figure 3:
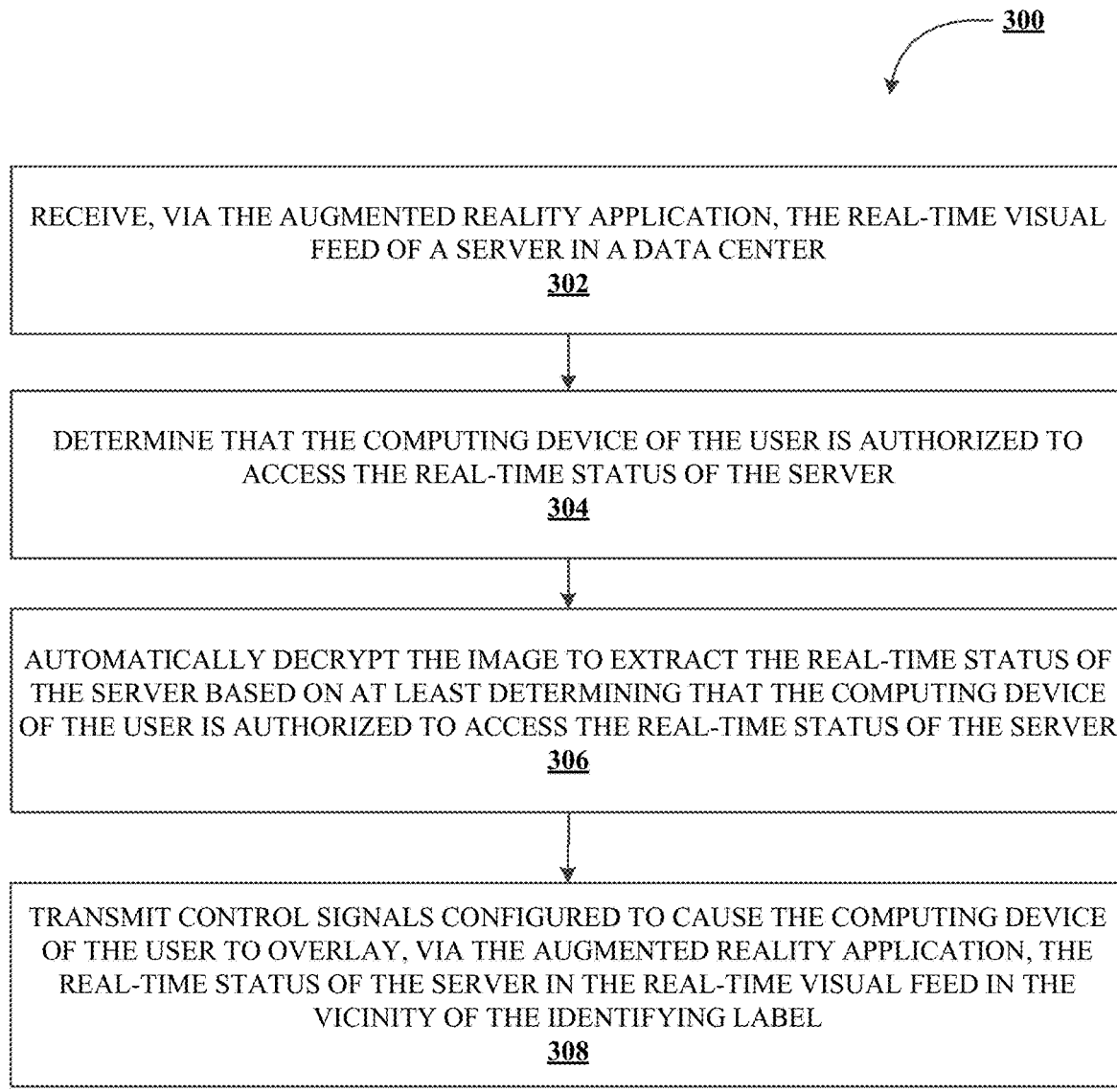

Having thus described embodiments of the invention in general terms, reference will now be made the accompanying drawings, wherein:

FIG. 1 illustrates technical components of a system for implementing steganography based augmented reality platform, in accordance with an embodiment of the invention;

FIG. 2 illustrates a process flow for implementing steganography based augmented reality platform, in accordance with an embodiment of the invention; and FIG. 3 illustrates a process flow for determining the status of a server in a data center using the steganography based augmented reality platform, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, or the like.

The use of augmented reality platforms in data center operations has increased in recent years. To maintain and structure operations, entities implement data center infrastructure management solutions using augmented reality platforms to streamline monitoring, management, and capacity planning of all resources in the data center. However, ensuring authorized access to monitoring such resources is a continuous challenge. The present invention provides the functional benefit of using steganography to encode resource information (e.g. server status) and implementing an authorization framework that ensures that only authenticated personnel are able to access the resource information via an augmented reality platform.

FIG. 1 presents an exemplary block diagram of the system environment for implementing steganography based augmented reality platform 100, in accordance with an embodiment of the invention. FIG. 1 provides a unique system that includes specialized servers and system communicably linked across a distributive network of nodes required to perform the functions of the process flows described herein in accordance with embodiments of the present invention.

As illustrated, the system environment 100 includes a network 110, a system 130, and a user input system 140. In some embodiments, the system 130, and the user input system 140 may be used to implement the processes described herein, in accordance with an embodiment of the present invention. In this regard, the system 130 and/or the user input system 140 may include one or more applications stored thereon (e.g., the augmented reality application) that are configured to interact with one another to implement any one or more portions of the various user interfaces and/or process flow described herein.

In accordance with embodiments of the invention, the system 130 is intended to represent various forms of digital computers, such as laptops, desktops, video recorders, audio/video player, radio, workstations, personal digital assistants, servers, wearable devices, Internet-of-things devices, electronic kiosk devices, blade servers, mainframes, or any combination of the aforementioned. In accordance with embodiments of the invention, the user input system 140 is intended to represent various forms of mobile devices, such as augmented reality (AR) devices, virtual reality (VR) devices, extended reality (XR) devices, personal digital assistants, cellular telephones, smartphones, and other similar computing devices. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multi-processor system). In some embodiments, the system 130 may be a server managed by the business. The system 130 may be located at the facility associated with the business or remotely from the facility associated with the business.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

In some embodiments, the system 130 may be configured to access, via the network110, a number of other computing devices (not shown) in addition to the user input system 140. In this regard, the system 130 may be configured to access one or more storage devices and/or one or more memory devices associated with each of the other computing devices. In this way, the system 130 may implement dynamic allocation and de-allocation of local memory resources among multiple computing devices in a parallel or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, it appears as though the memory is being allocated from a central pool of memory, even though the space is distributed throughout the system. This method of dynamically allocating memory provides increased flexibility when the data size changes during the lifetime of an application and allows memory reuse for better utilization of the memory resources when the data sizes are large.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1 also illustrates a user input system 140, in accordance with an embodiment of the invention. The user input system 140 includes a processor 152, memory 154, an input/output device such as a display 156, a communication interface 158, and a transceiver 160, among other components. The user input system 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input system 140, including instructions stored in the memory 154. The processor may be implemented as a chipset of chips that include separate and multiple analog and digital processors. The processor may be configured to provide, for example, for coordination of the other components of the user input system 140, such as control of user interfaces, applications run by user input system 140, and wireless communication by user input system 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input system 140 with other devices. External interface 168 may provide, for example, for wired communication in some implementations, or for wireless communication in other implementations, and multiple interfaces may also be used.

The memory 154 stores information within the user input system 140. The memory 154 can be implemented as one or more of a computer-readable medium or media, a volatile memory unit or units, or a non-volatile memory unit or units. Expansion memory may also be provided and connected to user input system 140 through an expansion interface (not shown), which may include, for example, a SIMM (Single In Line Memory Module) card interface. Such expansion memory may provide extra storage space for user input system 140 or may also store applications or other information therein. In some embodiments, expansion memory may include instructions to carry out or supplement the processes described above and may include secure information also. For example, expansion memory may be provided as a security module for user input system 140 and may be programmed with instructions that permit secure use of user input system 140. In addition, secure applications may be provided via the SIMM cards, along with additional information, such as placing identifying information on the SIMM card in a non-hackable manner. In some embodiments, the user may use the applications (e.g., augmented reality application) to execute processes described with respect to the process flows described herein. Specifically, the application executes the process flows described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer-or machine-readable medium, such as the memory 154, expansion memory, memory on processor 152, or a propagated signal that may be received, for example, over transceiver 160 or external interface 168.

In some embodiments, the user may use the user input system 140 to transmit and/or receive information or commands to and from the system 130 via the network 110. Any communication between the system 130 and the user input system 140 (or any other computing devices) may be subject to an authentication protocol allowing the system 130 to maintain security by permitting only authenticated users (or processes) to access the protected resources of the system 130, which may include servers, databases, applications, and/or any of the components described herein. To this end, the system 130 may require the user (or process) to provide authentication credentials to determine whether the user (or process) is eligible to access the protected resources. Once the authentication credentials are validated and the user (or process) is authenticated, the system 130 may provide the user (or process) with permissioned access to the protected resources. Similarly, the user input system 140 (or any other computing devices) may provide the system 130 with permissioned to access the protected resources of the user input system 130 (or any other computing devices), which may include a GPS device, an image capturing component (e.g., camera), a microphone, a speaker, and/or any of the components described herein.

The user input system 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000,or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation- and location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker, e.g., in a handset of user input system 140. Such sound may include sound from voice telephone calls, may include recorded sound (e.g., voice messages, music files, etc.) and may also include sound generated by one or more applications operating on the user input system 140, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a technical environment that includes a back end component (e.g., as a data server), that includes a middleware component (e.g., an application server), that includes a front end component (e.g., a client computer having a graphical user interface or a Web browser through which a user can interact with an implementation of the systems and techniques described here), or any combination of such back end, middleware, or front end components.

As shown in FIG. 1, the components of the system 130 and the user input system 140 are interconnected using the network 110. The network 110, which may be include one or more separate networks, be a form of digital communication network such as a telecommunication network, a local area network ("LAN"), a wide area network ("WAN"), a global area network ("GAN"), the Internet, or any combination of the foregoing. It will also be understood that the network 110 may be secure and/or unsecure and may also include wireless and/or wired and/or optical interconnection technology.

In accordance with an embodiments of the invention, the components of the system environment 100, such as the system 130 and the user input system 140 may have a client-server relationship, where the user input system 130 makes a service request to the system 130, the system 130 accepts the service request, processes the service request, and returns the requested information to the user input system 140, and vice versa. This relationship of client and server typically arises by virtue of computer programs running on the respective computers and having a client-server relationship to each other.

It will be understood that the embodiment of the system environment 100 illustrated in FIG. 1 is exemplary and that other embodiments may vary. As another example, in some embodiments, the system environment may include more, fewer, or different components. As another example, in some embodiments, some or all of the portions of the system environment 100 may be combined into a single portion. Likewise, in some embodiments, some or all of the portions of the system 130 may be separated into two or more distinct portions.

FIG. 2 illustrates a process flow for implementing steganography based augmented reality platform 200, in accordance with an embodiment of the invention. As shown in block 202, the process flow includes receiving, via the augmented reality application, a real-time visual feed. In some embodiments, the system (e.g., system 130) may be configured to provide an augmented reality application for installation on a computing device of the user (e.g., user input system 140). As described herein, the computing device of the user may include hardware and software components that are capable of executing the augmented reality application. By executing the augmented reality application thereon, the computing device of the user may be configured to provide the user an interactive experience of a real-world environment where the objects that reside in the real world are enhanced by computer-generated perceptual information, sometimes across multiple sensory modalities, including visual, auditory, haptic, somatosensory, and olfactory.

In some embodiments, the real-time visual feed may be a form of multimedia that is delivered in a continuous manner from a real-world environment. The real-time visual feed typically includes a variety of objects captured in the real-world environment. Each object may include an image, i.e., a label that provides object identifying information. Therefore, when capturing the real-world environment, some of the objects and their associated images are also captured in the real-time visual feed. In some embodiments, each image may be steganographically embedded with a message. Steganography is the technique of hiding a secret message within an ordinary, non-secret, image to avoid detection; the secret message is then extracted at its destination. However, to access any message that is embedded in the image, either the user or the computing device used to capture the real-world environment using the augmented reality application must be authenticated.

Next, as shown in block 204, the process flow includes determining that the computing device of the user is authorized to access the message. In this regard, the system may be configured to retrieve a unique device identifier associated with the computing device of the user. In some embodiments, the unique device identifier may be an entity-wide unique identifier (EID), a universally unique identifier (UUID), a globally unique identifier (GUID), and/or the like. Each unique device identifier may be a nominal categorical number of a specific size (e.g., 128 bits) used as labels to identify items uniquely. In response to retrieving the unique device identifier, the system may be configured to compare the unique device identifier with one or more device identifiers that are retrieved from a data repository associated with the image. The device identifiers in the data repository are associated with computing devices that have been previously authorized to access the message. Should the unique device identifier may any one of the previously authorized device identifiers, the system may be configured to determine that the computing device of the user is authorized to access the message.

In some embodiments, the system may be configured to determine whether the user is authorized to access the message instead of, or in addition to determining whether the computing device of the user is authorized to access the message. To this end, the system may be configured to initiate, via the augmented reality application, an authentication request in response to receiving the real-time visual feed. In response, the system may be configured to receive, via the augmented reality application, one or more authentication credentials of the user for processing. Based on the authentication credentials received, the system may be configured to determine that the user is authorized to access the message.

In some embodiments, the system may be configured to determine whether the user is authorized to access the entire message or a portion of the message. To this end, the system may be configured to determine an authorization level of the user based on at least processing the one or more authentication credentials. Also, the system may be configured to determine an authorization requirement associated with accessing the message. If the authorization level of the user meets the authorization requirement, then the user is authorized to access the entire message. On the other hand, if the authorization level of the user only meets a portion of the authorization requirement, then the system may be configured to determine that the user is only authorized to access a portion of the message that is commensurate with the portion of the authorization requirement that is met.

Next, as shown in block 206, the process flow includes generating an acknowledgement that the computing device of the user is authorized to access the message. In some embodiments, the acknowledgement may be an indication that recognizes that the computing device of the user is authorized to access the message. In one aspect, the system may be configured to generate the acknowledgement immediately after determining that the computing device of the user is authorized to access the message. However, the actual message may not be extracted from the image until the system receives an indication that the user has selected the acknowledgement. In another aspect, the system may be configured to decrypt the image to extract the message and then generate the acknowledgement.

Next, as shown in block 208, the process flow includes transmitting control signals configured to cause the computing device of the user to overlay, via the augmented reality application, the acknowledgement in the real-time visual feed in a vicinity of the image. In some embodiments, the vicinity of the image may refer to an immediate proximity of the image in the real-time visual feed adequate for any person to determine that an acknowledgement is associated with an image during observation. In this regard, the acknowledgement may be overlaid on the image itself, positioned immediately adjacent to the image, positioned away from the image with a visual pointer indicating its association with a particular image, and/or the like. For example, the acknowledgement may be a pop-up notification overlaid on each image in the real-time visual feed indicating that the underlying message in each image is available for access.

In some embodiments, the system may be configured to receive, via the augmented reality application, an indication that the user has selected the acknowledgement in the vicinity of the image. In response, the system may be configured to dynamically decrypt the image to extract the message based on at least receiving the indication. In response to extracting the message, the system may be configured to transmit control signals configured to cause the computing device of the user to overlay, via the augmented reality application, the extracted message in the real-time visual feed in a vicinity of the image.

In some embodiments, in response to determining that the computing device of the user is authorized to access the message, the system may be configured to automatically decrypt the image to extract the message from the image. In response to extracting the message, the system may be configured to transmit control signals configured to cause the computing device of the user to overlay, via the augmented reality application, the extracted message in the real-time visual feed in the vicinity of the image. In embodiments where the user is authorized to access only a portion of the message, the system may be configured to automatically decrypt only a portion of the message commensurate with the portion of the authorization requirement that is met. Once decrypted, the system may be configured to transmit control signals configured to cause the computing device of the user to overlay, via the augmented reality application, the portion of the message in the real-time visual feed in the vicinity of the image.

FIG. 3 illustrates a process flow for determining the status of a server in a data center using the steganography based augmented reality platform 300, in accordance with an embodiment of the invention. As shown in block 302, the process flow includes receiving, via the augmented reality application, the real-time visual feed of a server in a data center. Here, the real-time visual feed may include an image of an identifying label positioned on the server. The identifying label may include a message that is steganographically embedded in the image that provides a real-time status of the server. Next, as shown in block 304, the process flow includes determining that the computing device of the user is authorized to access the real-time status of the server.

Next, as shown in block 306, the process flow includes automatically decrypting the image to extract the real-time status of the server based on at least determining that the computing device of the user is authorized to access the real-time status of the server. Next, as shown in block 308, the process flow includes transmitting control signals configured to cause the computing device of the user to overlay, via the augmented reality application, the real-time status of the server in the real-time visual feed in the vicinity of the identifying label.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for implementing steganography based augmented reality platform, the system comprising:
   at least one non-transitory storage device; and
   at least one processing device coupled to the at least one non-transitory storage device, wherein the at least one processing device is configured to:
   provide an augmented reality application for installation on a computing device of a user;
   receive, via the augmented reality application, a real-time visual feed, wherein the real-time visual feed comprises an image, wherein the image comprises a message that is steganographically embedded therein;
   determine that the computing device of the user is authorized to access the message;
   generate an acknowledgement that the computing device of the user is authorized to access the message;
   transmit control signals configured to cause the computing device of the user to overlay, via the augmented reality application, the acknowledgement in the real-time visual feed in a vicinity of the image;
   receive, via the augmented reality application, user selection of the acknowledgement in the vicinity of the image;
   dynamically decrypt the image to extract the message based on at least receiving the user selection; and
   transmit control signals configured to cause the computing device of the user to overlay, via the augmented reality application, the extracted message in the real-time visual feed in a vicinity of the image.

2. The system of claim 1, wherein the at least one processing device is further configured to:
   determine that the computing device of the user is authorized to access the message;
   automatically decrypt the image to extract the message based on at least determining that the computing device of the user is authorized to access the message; and
   transmit control signals configured to cause the computing device of the user to overlay, via the augmented reality application, the extracted message in the real-time visual feed in the vicinity of the image.

3. The system of claim 1, wherein determining that the computing device of the user is authorized to access the message further comprises:
   retrieving a unique device identifier associated with the computing device of the user;
   retrieving one or more device identifiers from a data repository associated with the image, wherein the one or more device identifiers are associated with one or more computing devices that are authorized to access the message;
   determining a match between the unique device identifier and the one or more identifiers; and
   determining that the computing device of the user is authorized to access the message based on at least determining the match.

4. The system of claim 1, wherein determining that the user is authorized to access the message, wherein determining further comprises:
   initiating, via the augmented reality application, an authentication request in response to receiving the real-time visual feed;
   receiving, via the augmented reality application, one or more authentication credentials of the user for processing; and
   determining that the user is authorized to access the message based on at least processing the one or more authentication credentials.

5. The system of claim 4, wherein the at least one processing device is further configured to:
   determine an authorization level of the user based on at least processing the one or more authentication credentials;
   determine an authorization requirement associated with accessing the message;
   determine that the authorization level of the user meets a portion of the authorization requirement associated with the accessing the message;
   automatically decrypt a portion of the message based on at least the portion of the authorization requirement that is met; and
   transmit control signals configured to cause the computing device of the user to overlay, via the augmented reality application, the portion of the message in the real-time visual feed in the vicinity of the image.

6. The system of claim 1, wherein the at least one processing device is further configured to:
   receive, via the augmented reality application, the real-time visual feed of a server in a data center, wherein the real-time visual feed comprises the image of an identifying label positioned on the server, wherein the message that is steganographically embedded in the image provides a real-time status of the server;
   determine that the computing device of the user is authorized to access the real-time status of the server;
   automatically decrypt the image to extract the real-time status of the server based on at least determining that the computing device of the user is authorized to access the real-time status of the server; and
   transmit control signals configured to cause the computing device of the user to overlay, via the augmented reality application, the real-time status of the server in the real-time visual feed in the vicinity of the identifying label.

7. A computer program product for implementing steganography based augmented reality platform, the computer program product comprising a non-transitory computer-readable medium comprising code causing a first apparatus to:
   provide an augmented reality application for installation on a computing device of a user;
   receive, via the augmented reality application, a real-time visual feed, wherein the real-time visual feed comprises an image, wherein the image comprises a message that is steganographically embedded therein;
   determine that the computing device of the user is authorized to access the message;
   generate an acknowledgement that the computing device of the user is authorized to access the message;
   transmit control signals configured to cause the computing device of the user to overlay, via the augmented reality application, the acknowledgement in the real-time visual feed in a vicinity of the image;
   receive, via the augmented reality application, user selection of the acknowledgement in the vicinity of the image;

dynamically decrypt the image to extract the message based on at least receiving the user selection; and transmit control signals configured to cause the computing device of the user to overlay, via the augmented reality application, the extracted message in the real-time visual feed in a vicinity of the image.

8. The computer program product of claim 7, wherein the first apparatus is further configured to:

determine that the computing device of the user is authorized to access the message;

automatically decrypt the image to extract the message based on at least determining that the computing device of the user is authorized to access the message; and transmit control signals configured to cause the computing device of the user to overlay, via the augmented reality application, the extracted message in the real-time visual feed in the vicinity of the image.

9. The computer program product of claim 7, wherein determining that the computing device of the user is authorized to access the message further comprises:

retrieving a unique device identifier associated with the computing device of the user;

retrieving one or more device identifiers from a data repository associated with the image, wherein the one or more device identifiers are associated with one or more computing devices that are authorized to access the message;

determining a match between the unique device identifier and the one or more identifiers; and determining that the computing device of the user is authorized to access the message based on at least determining the match.

10. The computer program product of claim 7, wherein determining that the user is authorized to access the message, wherein determining further comprises:

initiating, via the augmented reality application, an authentication request in response to receiving the real-time visual feed;

receiving, via the augmented reality application, one or more authentication credentials of the user for processing; and determining that the user is authorized to access the message based on at least processing the one or more authentication credentials.

11. The computer program product of claim 10, wherein the first apparatus is further configured to:

determine an authorization level of the user based on at least processing the one or more authentication credentials;

determine an authorization requirement associated with accessing the message;

determine that the authorization level of the user meets a portion of the authorization requirement associated with the accessing the message;

automatically decrypt a portion of the message based on at least the portion of the authorization requirement that is met; and transmit control signals configured to cause the computing device of the user to overlay, via the augmented reality application, the portion of the message in the real-time visual feed in the vicinity of the image.

12. The computer program product of claim 7, wherein the first apparatus is further configured to:

receive, via the augmented reality application, the real-time visual feed of a server in a data center, wherein the real-time visual feed comprises the image of an identifying label positioned on the server, wherein the message that is steganographically embedded in the image provides a real-time status of the server;

determine that the computing device of the user is authorized to access the real-time status of the server;

automatically decrypt the image to extract the real-time status of the server based on at least determining that the computing device of the user is authorized to access the real-time status of the server; and transmit control signals configured to cause the computing device of the user to overlay, via the augmented reality application, the real-time status of the server in the real-time visual feed in the vicinity of the identifying label.

13. A method for implementing steganography based augmented reality platform, the method comprising:

providing an augmented reality application for installation on a computing device of a user;

receiving, via the augmented reality application, a real-time visual feed, wherein the real-time visual feed comprises an image, wherein the image comprises a message that is steganographically embedded therein;

determining that the computing device of the user is authorized to access the message;

generating an acknowledgement that the computing device of the user is authorized to access the message;

transmitting control signals configured to cause the computing device of the user to overlay, via the augmented reality application, the acknowledgement in the real-time visual feed in a vicinity of the image;

receiving, via the augmented reality application, user selection of the acknowledgement in the vicinity of the image;

decrypting the image to extract the message based on at least receiving the user selection; and transmitting control signals configured to cause the computing device of the user to overlay, via the augmented reality application, the extracted message in the real-time visual feed in a vicinity of the image.

14. The method of claim 13, wherein the method further comprises:

determining that the computing device of the user is authorized to access the message;

automatically decrypting the image to extract the message based on at least determining that the computing device of the user is authorized to access the message; and transmitting control signals configured to cause the computing device of the user to overlay, via the augmented reality application, the extracted message in the real-time visual feed in the vicinity of the image.

15. The method of claim 13, wherein determining that the computing device of the user is authorized to access the message further comprises:

retrieving a unique device identifier associated with the computing device of the user;

retrieving one or more device identifiers from a data repository associated with the image, wherein the one or more device identifiers are associated with one or more computing devices that are authorized to access the message;

determining a match between the unique device identifier and the one or more identifiers; and determining that the computing device of the user is authorized to access the message based on at least determining the match.

16. The method of claim 13, wherein determining that the user is authorized to access the message, wherein determining further comprises:

initiating, via the augmented reality application, an authentication request in response to receiving the real-time visual feed;

receiving, via the augmented reality application, one or more authentication credentials of the user for processing; and determining that the user is authorized to access the message based on at least processing the one or more authentication credentials.

17. The method of claim 16, wherein the method further comprises:

determining an authorization level of the user based on at least processing the one or more authentication credentials;

determining an authorization requirement associated with accessing the message;

determining that the authorization level of the user meets a portion of the authorization requirement associated with the accessing the message;

automatically decrypting a portion of the message based on at least the portion of the authorization requirement that is met; and transmitting control signals configured to cause the computing device of the user to overlay, via the augmented reality application, the portion of the message in the real-time visual feed in the vicinity of the image.

* * * * *